United States Patent
Huth

(10) Patent No.: US 9,200,593 B2
(45) Date of Patent: Dec. 1, 2015

(54) ENERGY ABSORBING FAN BLADE SPACER

(75) Inventor: Brian P. Huth, Westfield, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 1666 days.

(21) Appl. No.: 12/537,506

(22) Filed: Aug. 7, 2009

(65) Prior Publication Data

US 2011/0033292 A1    Feb. 10, 2011

(51) Int. Cl.

| F01D 21/04 | (2006.01) |
|---|---|
| F02K 3/06 | (2006.01) |
| F01D 5/22 | (2006.01) |
| F01D 5/30 | (2006.01) |
| F01D 11/00 | (2006.01) |
| B64D 33/02 | (2006.01) |

(52) U.S. Cl.
CPC ... *F02K 3/06* (2013.01); *F01D 5/22* (2013.01); *F01D 5/225* (2013.01); *F01D 5/30* (2013.01); *F01D 11/008* (2013.01); *F01D 21/045* (2013.01); *B64D 2033/022* (2013.01)

(58) Field of Classification Search
CPC .............. F02K 3/06; F01D 5/30; F01D 5/225; F01D 5/22; F01D 11/008; F01D 21/045; B64D 2033/022
USPC ...... 415/1, 9; 416/2, 190, 191, 193 R, 193 A, 416/194, 195, 196 R, 248, 1
See application file for complete search history.

(56) References Cited

U.S. PATENT DOCUMENTS

| 3,712,757 | A | * | 1/1973 | Goodwin ................. 416/193 R |
|---|---|---|---|---|
| 4,621,979 | A | * | 11/1986 | Zipps et al. .................. 416/190 |
| 4,655,687 | A | * | 4/1987 | Atkinson .................. 416/193 A |
| 5,232,346 | A | | 8/1993 | Mitchell, Jr. et al. |
| 5,277,548 | A | * | 1/1994 | Klein et al. ............... 416/193 A |
| 5,443,365 | A | | 8/1995 | Ingling et al. |
| 5,501,575 | A | | 3/1996 | Eldredge et al. |
| 6,217,277 | B1 | | 4/2001 | Liu et al. |
| 6,217,283 | B1 | * | 4/2001 | Ravenhall et al. ................ 416/2 |
| 6,416,280 | B1 | | 7/2002 | Forrester et al. |
| 6,457,942 | B1 | | 10/2002 | Forrester |
| 6,773,234 | B2 | | 8/2004 | Sinha et al. |
| 6,951,448 | B2 | | 10/2005 | Duesler et al. |
| 7,153,099 | B2 | * | 12/2006 | Queriault et al. ................ 416/2 |
| 7,186,079 | B2 | | 3/2007 | Suciu et al. |

(Continued)

FOREIGN PATENT DOCUMENTS

| EP | 0787890 | 8/1997 |
|---|---|---|
| EP | 1046785 | 10/2000 |

(Continued)

OTHER PUBLICATIONS

EP Search Report for Application No. 10251250.6 completed on Mar. 10, 2014.

*Primary Examiner* — Christopher Verdier
(74) *Attorney, Agent, or Firm* — Carlson, Gaskey & Olds, P.C.

(57) ABSTRACT

A gas turbine engine fan section is disclosed that includes a hub. Circumferentially spaced fan blades are supported on the hub. A spacer is arranged between adjacent fan blades and is operatively supported by the hub. The spacer is configured to be collapsible in response to a fan blade load exerted on the spacer in excess of a threshold load. The spacer is generally rigid at fan blade loads below the threshold load.

4 Claims, 2 Drawing Sheets

(56) References Cited

U.S. PATENT DOCUMENTS

| | | |
|---|---|---|
| 7,494,316 B2 | 2/2009 | Barnett et al. |
| 7,530,782 B2 | 5/2009 | Barnett et al. |
| 2005/0276691 A1 | 12/2005 | Queriault et al. |
| 2008/0159866 A1* | 7/2008 | Evans ................... 416/193 A |
| 2008/0232969 A1 | 9/2008 | Brault et al. |

FOREIGN PATENT DOCUMENTS

| | | |
|---|---|---|
| EP | 1881159 | 7/2006 |
| EP | 1881160 | 1/2008 |

* cited by examiner

ENERGY ABSORBING FAN BLADE SPACER

BACKGROUND

This disclosure relates to a gas turbine engine fan section. More particularly, the disclosure relates to spacers used between circumferentially arranged fan blades in the fan section.

One type of gas turbine engine includes a fan section arranged at an inlet of the engine. The fan section includes multiple circumferentially spaced fan blades that must be designed to withstand ingestion of foreign objects during operation, such as bird strikes. The use of composite material for fan blades has become more prevalent to reduce engine weight and improve fuel efficiency. Designing a fan blade constructed from composite materials that performs during foreign object ingestion in a desired manner is challenging due to the reduced ductility of the composite materials as compared to conventional metal blades.

Designing fan blades for bird strike scenarios is challenging for at least two reasons. First, the fan blade must perform in a desired manner during the actual bird strike at the impact sight. Second, the fan blade is subject to high bending and twisting loads near the fan blade attachment location in response to the impact energy. The attachment locations are typically provided by hub slots that receive a root at a base of each fan blade. The root loads are especially damaging if the fan blade is rigidly constrained at the inner flow path. Some fan sections use spacers between the fan blades at the hub. High root loads can result in catastrophic separation of the fan blade from the hub, which is undesirable. For example, the rigid spacers can act as a fulcrum against which the fan blades act under bending and/or twisting loads, resulting in fracture and separation of the fan blades from their roots.

SUMMARY

A gas turbine engine fan section is disclosed that includes a hub. Circumferentially spaced fan blades are supported on the hub. A spacer is arranged between adjacent fan blades and is operatively supported by the hub. The spacer is configured to be collapsible in response to a fan blade load exerted on the spacer in excess of a threshold load. The spacer is generally rigid at fan blade loads below the threshold load.

A method of absorbing energy in a fan section includes inducing a fan blade load on a spacer that exceeds a threshold load, such as during a bird strike. The spacer collapses in response to the fan blade load to absorb energy from the fan blade.

DETAILED DESCRIPTION

Figure 1:
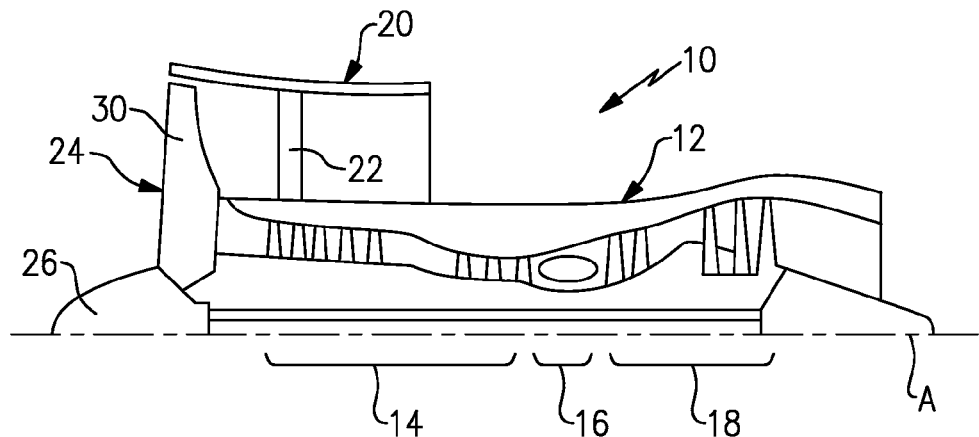
FIG. 1 is a schematic view of an example gas turbine engine.

A gas turbine engine 10 is schematically shown in FIG. 1. The engine 10 includes a core 12 having a compressor section 14, a combustion section 16 and a turbine section 18. A fan case 20 is supported on the core 12 by flow exit guide vanes 22. The fan case 20 houses a fan section 24 in front of the core 12 that includes multiple circumferentially arranged fan blades 30 and a nose cone 26. The compressor, turbine and fan sections 14, 18, 24 are rotatable about an axis A.

Figure 2:
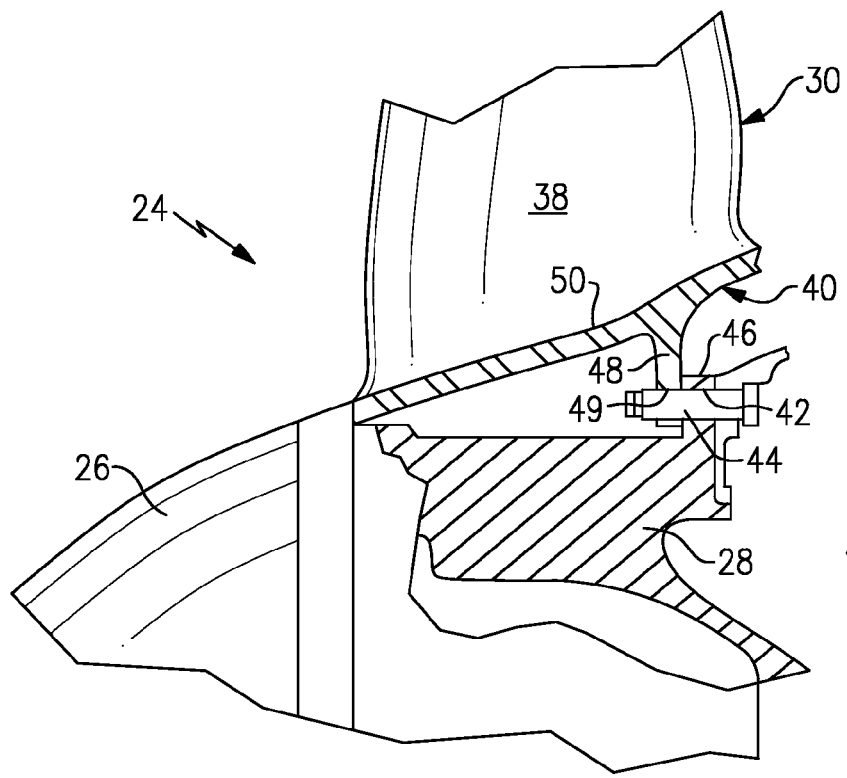
FIG. 2 is an enlarged cross-sectional view of a portion of a fan section.
Figure 3:
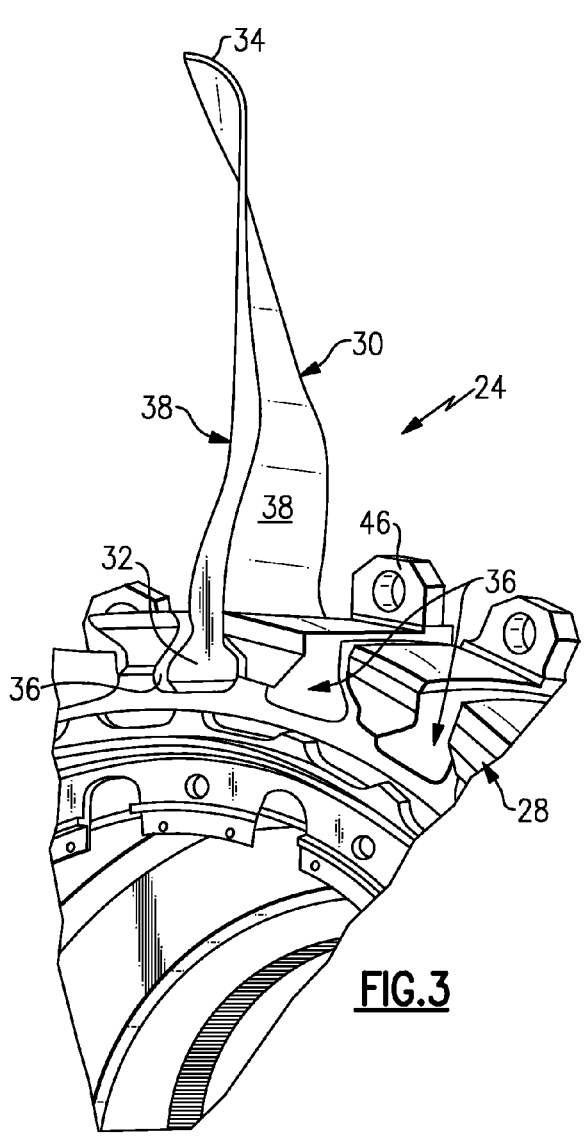
FIG. 3 is an enlarged perspective view of a fan blade supported in a hub of the fan section shown in FIG. 2.
Figure 4:
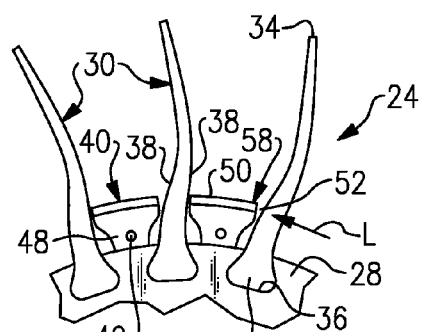
FIG. 4 is a schematic end view of multiple fan blades and example spacers supported on the hub.

Referring to FIGS. 2-4, the fan section 24 includes a hub 28 rotatable about the axis A (FIG. 1). The hub 28 supports the nose cone 26 and multiple circumferentially arranged fan blades 30. Each fan blade 30 includes a root 32 that is supported within a correspondingly shaped slot 36 in the hub 28, as shown in FIG. 3. An airfoil portion of the fan blade 30 extends from the root 32 to a tip 34, which is located in close proximity to the fan case 20 (FIG. 1).

Each fan blade 30 includes opposing lateral sides 38. A spacer 40 is arranged between facing lateral sides 38 of adjoining fan blades 30, as best illustrated in FIG. 4. The spacers 40 are secured to the hub 28 in a suitable manner that facilitates ease of assembly of the fan section 24. In one example, the hub 28 includes multiple circumferentially arranged flanges 46 that each includes an aperture 42. Each spacer 40 includes a base 48 having an opening 49. A fastener 44 extends through the aperture 42 and opening 49 to secure the spacer 40 to its respective flange 46.

The spacers 40 are arranged in close proximity to the lateral sides 38 to provide a smooth aerodynamic surface 50 at the inner flow path of the fan section 24. Typical spacers are very stiff, even during loading experienced during bird strikes and behave like a fulcrum, which may result in a fracture of the fan blade 30 at the inner flow path near the root 32 at a fan blade load L that exceeds a threshold load as the fan blade twists and/or bends at the spacer 40. An example threshold in-plane bending load is $1.5 \times 10^6$ in-lbs. ($1.7 \times 10^5$ N m), but it should be understood that threshold loads vary by application. The disclosed example spacers 40, 140, 240 collapse to absorb the energy of bending and twisting fan blade loads L imparted to a fan blade contact area 52 by the lateral sides 38 of the fan blades 30 resulting from foreign object ingestion. The spacers 40, 140, 240 are generally rigid at fan blade loads below the threshold load.

A typical spacer is constructed from a metallic material, such as INCONEL, having a modulus of elasticity of $29 \times 10^6$ PSI ($2.0 \times 10^{11}$ N m). The example spacer 40 shown in FIG. 4 is constructed from a material having a modulus of elasticity of at least less than $20 \times 10^6$ PSI ($1.4 \times 10^{11}$ N m), which is capable of absorbing energy in response to a fan blade load L on the spacer 40 at a fan blade contact area 52 in excess of the threshold load, unlike the more rigid prior art spacers.

Figure 5:
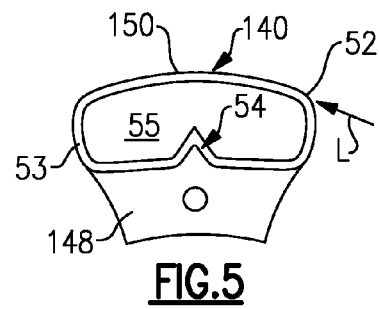
FIG. 5 is a schematic view of an example spacer.

Another example spacer 140 is illustrated schematically in FIG. 5. The spacer 140 provides an aerodynamic surface 150 supported by a base 148. The spacer 140 includes a relatively thin wall 53 providing a cavity 55. The thin wall 53 includes at least one collapse-inducing structure or notch 54. The spacer 140 is designed to crumple in a controlled manner and absorb energy from the fan blades 30 as the lateral sides 38 apply a lateral load L to the spacer 140 at a fan blade contact area 52 in excess of the threshold load.

Figure 6:
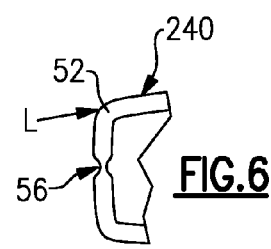
FIG. 6 is a schematic view of a portion of another example spacer.

Referring to FIG. 6, another example spacer 240 is illustrated. The spacer 240 includes a wall having a frangible connection 56. The frangible connection 56 fractures in a controlled manner and absorb energy from the fan blades 30 as the lateral sides 38 apply a fan blade load L to the spacer 240 at a fan blade contact area 52 in excess of the threshold load.

Figure 7:
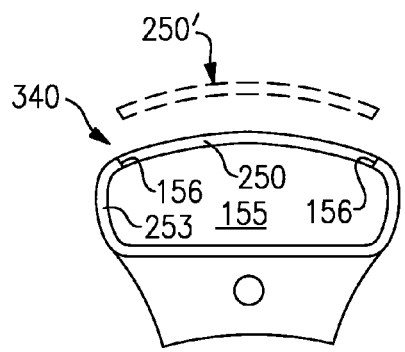
FIG. 7 is a schematic view of another example spacer.

FIG. 7 illustrates another example spacer 340. The spacer 340 includes a wall 253 to which a wall 250 providing an aerodynamic surface is secured. In one example, the wall 250 includes opposing ends secured to the wall 253 by frangible connections 156. In one example, the ends of the wall 250 are bonded to the wall 253 by an adhesive. The wall 250 breaks away or becomes detached from the wall 250, as illustrated by dashed line 250', when the fan blade load L exceeds the threshold load. In this manner, the wall 250 deflects and the wall 253 collapses into cavity 155, which absorbs the load L.

Figure 8:
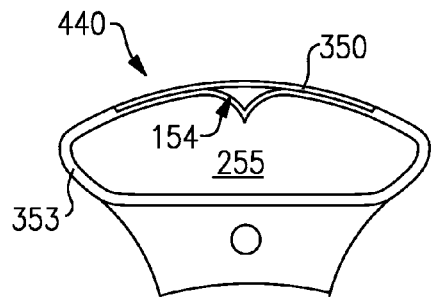
FIG. 8 is a schematic view of another example spacer.

Another example spacer 440 is illustrated in FIG. 8. The wall 353 includes a notch 154 at an upper portion. The wall 353 provides a cavity 255. A wall providing an aerodynamic surface 350 is secured to the wall 353, such as by bonding. The wall 353 provides a structural support for the wall 350, which is a non-structural aerodynamic fairing. The wall fails in a controlled manner when the fan blade load L exceeds a threshold load and collapses in a controlled manner at notch 154, deflecting the wall 350 radially outward.

The disclosed spacers 40, 140, 240, 340, 440 fail in a controlled manner when a lateral load L on the spacer exceeds a threshold load. Controlled collapse of the spacer eliminates the fulcrum of the prior art enabling some of the impact energy on the airfoil portion of the fan blade 30 to be transferred to the root 32.

Although example embodiments have been disclosed, a worker of ordinary skill in this art would recognize that certain modifications would come within the scope of the claims. For that reason, the following claims should be studied to determine their true scope and content.

What is claimed is:

1. A gas turbine engine fan section comprising:
   a hub having a flange with an aperture;
   circumferentially spaced fan blades supported on the hub; and
   a spacer arranged between adjacent fan blades and operatively supported by the hub, the spacer configured to be collapsible in response to a fan blade load exerted on the spacer in excess of a threshold load, the spacer generally rigid at fan blade loads below the threshold load, wherein the spacer includes a base with an opening, and a fastener extends through the aperture and the opening to secure the spacer to the hub, wherein the spacer includes a wall providing a cavity, the wall including a notch providing a collapse-inducing structure deforming the cavity in response to the fan blade load.

2. A gas turbine engine fan section comprising:
   a hub having a flange with an aperture;
   circumferentially spaced fan blades supported on the hub; and
   a spacer arranged between adjacent fan blades and operatively supported by the hub, the spacer configured to be collapsible in response to a fan blade load exerted on the spacer in excess of a threshold load, the spacer generally rigid at fan blade loads below the threshold load, wherein the spacer includes a base with an opening, and a fastener extends through the aperture and the opening to secure the spacer to the hub, wherein the spacer includes a wall providing a frangible connection, the frangible connection configured to fracture in response to the fan blade load.

3. A spacer for a gas turbine engine fan section comprising:
   structure including a fan blade contact area, the structure configured to be collapsible in response to a fan blade load exerted on the fan blade contact area in excess of a threshold load, the structure generally rigid at fan blade loads below the threshold load;
   wherein the structure includes a wall providing a cavity, the wall including a notch providing a collapse-inducing structure deforming the cavity in response to the fan blade load; and
   wherein another wall is secured over the notch, the other wall providing a non-structural aerodynamic fairing.

4. The spacer according to claim 3, wherein the structure is constructed from a material having a modulus of elasticity of less than $20 \times 10^6$ PSI ($1.4 \times 10^{11}$ N m), the material deforming in response to the fan blade load.

* * * * *